No. 810,385. PATENTED JAN. 23, 1906.
M. J. BARTLETT.
CATTLE TAG.
APPLICATION FILED JULY 5, 1904.
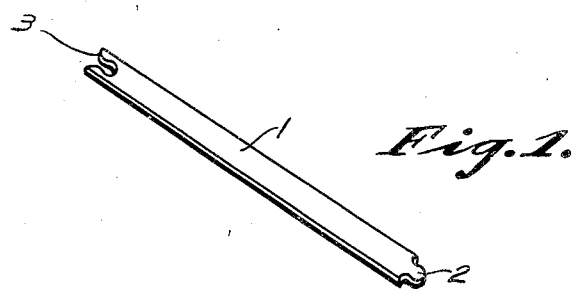
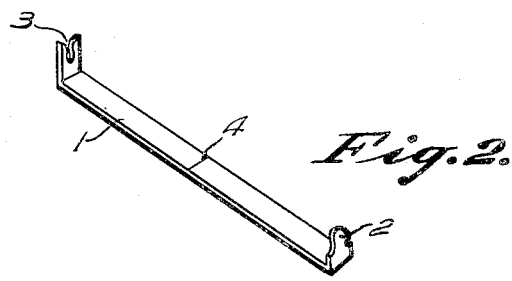
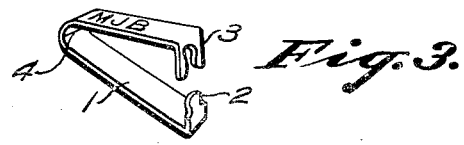
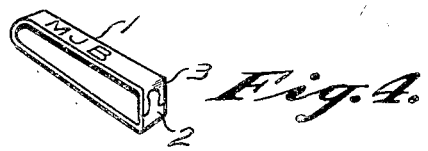

UNITED STATES PATENT OFFICE.

MARCUS J. BARTLETT, OF CHICAGO, ILLINOIS.

CATTLE-TAG.

No. 810,385.  Specification of Letters Patent.  Patented Jan. 23, 1906.

Application filed July 5, 1904. Serial No. 215,441.

*To all whom it may concern:*

Be it known that I, MARCUS J. BARTLETT, a citizen of the United States of America, and a resident of Chicago, in the county of Cook and State of Illinois, have invented certain new and useful Improvements in Cattle-Tags, of which the following is a specification.

The main objects of my invention are to provide an improved form of cattle-tag suitable for being attached to the ear of an animal. I accomplish these objects by the device shown in the accompanying drawings, in which—

Figure 1 is a perspective view of a strip of sheet metal, representing the first step in the process of forming a cattle-tag according to my invention. Fig. 2 is a perspective view of the same, showing the result of the second step. Fig. 3 represents the cattle-tag in the form in which it is delivered to the market. Fig. 4 shows the same in its closed position as when applied to the ear of an animal.

In the form shown my cattle-tag consists of a band of suitable material forming a loop adapted to be passed through a perforation in the ear of an animal and having its ends suitably formed for interlocking to prevent the tag from working loose or being easily detached from the ear.

The tag is preferably formed of a strip of non-corrosive metal, such as aluminium. This strip 1 is first stamped to the form shown in Fig. 1, its ends being oppositely dovetailed for interlocking engagement with each other. The end 2 is provided with a tongue having a slightly-contracted neck, and the end 3 is provided with a socket fitting the tongue 2. The second operation consists in bending the ends 2 and 3 toward one side of the strip 1 and at right angles to the same, as shown in Fig. 2, and notching the strip on the same side on a transverse line 4, located exactly midway between the ends 2 and 3. The strip is then bent as shown in Fig. 3. The notch 4, having weakened the strip at its middle point, serves to locate the bend with such accuracy as to insure the perfect register of the ends when pressed together to form shown in Fig. 4. The tag thus takes the form of a continuous band of material of uniform cross-section at all points. The tags are delivered to the user bent to the form shown in Fig. 3 and are closed by him by means of a suitable instrument at the time of applying the tag to the animal. The blanks from which these tags are formed may be stamped complete from a sheet of metal, but are preferably made by cutting into pieces of the desired length a long strip or flat wire having the desired cross-section. The shearing dies are shaped to conform with the dovetailed ends of the blank, so that at each stroke of the die the male end of one blank and the female end of the next succeeding blank are simultaneously formed.

The operation of applying the tag consists in perforating the ear of the animal by means of a suitable punch and then by means of suitable pliers closing the tag around the edge of the ear, with its joint seated in the perforation. The dovetailed formation of the ends serves to secure them into tight contact with each other and prevents the resilience of the material from springing the ends slightly apart, as would naturally occur if such ends were merely abutted without being dovetailed together. The tongue at the end 2 is suitably formed so that it may be readily forced endwise into the socket at the end 3 without permanently bending the sides of said socket outwardly, and the resilience of the material causes the sides of the socket to close around the head, and thus hold the two ends into tight contact with each other, leaving no space for the lodging of dirt at the joint.

What I claim as my invention, and desire to secure by Letters Patent, is—

1. A cattle-tag comprising a blank of suitable form to permit of being stamped directly from a strip or sheet of metal and having its ends bent upward and oppositely dovetailed and adapted to be sprung endwise into interlocking engagement with each other to form a closed loop.

2. A cattle-tag comprising a blank of suitable shape to permit of being stamped directly from a strip or sheet of metal, and having its ends bent upward and oppositely dovetailed and adapted to be sprung endwise into interlocking engagement with each other, said blank being scored midway between said ends to cause said ends to register in interlocking engagement when the tag is bent to form a closed loop, substantially as described.

Signed at Chicago this 2d day of July, 1904.

MARCUS J. BARTLETT.

Witnesses:
 EUGENE A. RUMMLER,
 GLEN C. STEPHENS.